United States Patent
Bugenhagen (10) Patent No.: US 8,873,717 B2
(45) Date of Patent: Oct. 28, 2014

(54) EMERGENCY ALERT SIGNALING

(75) Inventor: Michael K. Bugenhagen, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 454 days.

(21) Appl. No.: 13/302,053

(22) Filed: Nov. 22, 2011

(65) Prior Publication Data

US 2012/0126976 A1 May 24, 2012

Related U.S. Application Data (60) Provisional application No. 61/416,600, filed on Nov. 23, 2010, provisional application No. 61/429,866, filed on Jan. 5, 2011, provisional application No. 61/435,056, filed on Jan. 21, 2011, provisional application No. 61/481,282, filed on May 2, 2011.

(51) Int. Cl.
*H04M 11/04* (2006.01)
*G08B 25/14* (2006.01)
*G08B 25/08* (2006.01)

(52) U.S. Cl.
CPC ............... *G08B 25/08* (2013.01); *G08B 25/14* (2013.01)
USPC ........................ 379/37; 455/404.1; 455/404.2

(58) Field of Classification Search
CPC ... H04H 20/59; G08B 25/00; H04M 1/72536; H04M 2242/04
USPC ............................. 379/37; 455/404.1, 404.2
See application file for complete search history.

(56) References Cited

U.S. PATENT DOCUMENTS

| | | | |
|---|---|---|---|
| 6,385,302 B1 * | 5/2002 | Antonucci et al. ............... | 379/45 |
| 7,233,781 B2 * | 6/2007 | Hunter et al. ............... | 455/404.1 |
| 7,756,913 B1 | 7/2010 | Day | |
| 7,860,964 B2 | 12/2010 | Stolorz et al. | |
| 7,903,553 B2 | 3/2011 | Liu | |
| 8,412,147 B2 * | 4/2013 | Hunter et al. ............... | 455/404.1 |
| 8,489,731 B2 | 7/2013 | Gagliardi et al. | |
| 2003/0020764 A1 | 1/2003 | Germain et al. | |
| 2004/0196842 A1 | 10/2004 | Dobbins | |
| 2005/0160154 A1 | 7/2005 | Raciborski et al. | |
| 2006/0143293 A1 | 6/2006 | Freedman et al. | |
| 2006/0285500 A1 | 12/2006 | Bopth et al. | |
| 2007/0064604 A1 | 3/2007 | Chen et al. | |
| 2008/0089237 A1 | 4/2008 | Molen et al. | |
| 2008/0295131 A1 | 11/2008 | Grover et al. | |

(Continued)

OTHER PUBLICATIONS

U.S. Appl. No. 13/302,055, Non-Final Rejection dated Jan. 6, 2014; 42 pages.
U.S. Appl. No. 13/302,051, filed Nov. 22, 2011 by Michael K. Bugenhagen, and entitled, "User-Based Monitoring and Control."
U.S. Appl. No. 13/302,055, filed Nov. 22, 2011 by Michael K. Bugenhagen, and entitled, "User Control Over Content Delivery."
U.S. Appl. No. 13/302,051, Non-Final Office Action dated Apr. 9, 2014; 6 pages.

(Continued)

*Primary Examiner* — Creighton Smith
(74) *Attorney, Agent, or Firm* — Swanson & Bratschun, L.L.C.

(57) ABSTRACT

Novel tools and techniques to allow enhanced distribution of emergency messages and other public information. In one aspect, these tools can provide a secure channel for an emergency message source to prevent compromise of the distribution system, to ensure the integrity of alerts distributed by the system. In another aspect, these can employ a universal signaling point that can receive an emergency message intended for a particular consumer and ensure that the message is distributed appropriately among the consumer's devices. The customer signaling point might register customer devices and/or maintain a state machine that devices can access once registered with the customer signaling point.

25 Claims, 5 Drawing Sheets

(56) References Cited

U.S. PATENT DOCUMENTS

| | | |
|---|---|---|
| 2010/0100629 A1 | 4/2010 | Raciborski et al. |
| 2010/0246436 A1 | 9/2010 | Yang et al. |
| 2010/0257264 A1 | 10/2010 | Assadzadeh |
| 2012/0131096 A1 | 5/2012 | Bugenhagen |
| 2012/0131466 A1 | 5/2012 | Bugenhagen |
| 2012/0224572 A1* | 9/2012 | Mody et al. .......... 370/351 |
| 2013/0241726 A1* | 9/2013 | Hunter et al. .......... 340/504 |
| 2013/0308453 A1 | 11/2013 | Cook |

OTHER PUBLICATIONS

U.S. Appl. No. 13/302,051, filed Nov. 22, 2011 by Michael K. Bugenhagen, and entitled, "User-Based Monitoring and Control".

U.S. Appl. No. 13/302,055, filed Nov. 22, 2011 by Michael K. Bugenhagen, and entitled, "User Control Over Content Delivery".

U.S. Appl. No. 13/302,051, Non-Final Office Action dated Aug. 1, 2014; 24 pages.

U.S. Appl. No. 13/302,055; Final Rejection dated Aug. 26, 2014; 30 pages.

* cited by examiner

EMERGENCY ALERT SIGNALING

CROSS-REFERENCES TO RELATED APPLICATIONS

The present disclosure may be related to the following commonly assigned applications/patents:

This application claims the benefit, under 35, U.S.C. §119 (e), from the following co-pending applications, the entire disclosure of each of which is hereby incorporated by reference, as if set forth in full in this document, for all purposes: provisional U.S. Patent Application No. 61/416,600,, filed Nov. 23, 2010,, by Michael K. Bugenhagen and titled "Line Performance Metrics Customer signaling point"; provisional U.S. Patent Application No. 61/429,866, filed Jan. 5, 2011,, by Michael K. Bugenhagen and titled "Line Performance Metrics Customer signaling point"; provisional U.S. Patent Application No. 61/435,056, filed Jan. 21, 2011,, by Michael K. Bugenhagen and titled "Access Control"; and provisional U.S. Patent Application No. 61/481,282, filed May 2, 2011,, by Michael K. Bugenhagen and titled "Communications Path State Machine."

The respective disclosures of these applications/patents are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to computer networks, and more particularly, to tools and techniques for providing customers of an Internet service provider with enhanced monitoring and control over their Internet connections.

BACKGROUND

Many governmental and public service agencies use emergency alerts to inform the public of weather events, hazards, natural disasters, and other events that have public significance. Current emergency alerting systems are "system" bound, in that the alerts are presented to the public via television and/or radio broadcast systems. Although the current "Emergency Alert System" has evolved over time, the system has not been able to keep pace with technological and social change.

For example, as entertainment and news options have expanded, many people only infrequently, if at all, consume broadcast television or radio. Instead, people might consume streaming content over an Internet connection or play content stored on local, customer-owned devices, and obtain news from websites, and the like, which are not part of the traditional emergency alert systems. As a result of this shift in entertainment and news consumption, many people might not be exposed to emergency alerts in timely fashion.

Thus, there is a need for an improved framework for distributing important information, such as emergency alerts.

BRIEF SUMMARY

Certain embodiments, therefore, provide tools and techniques to allow enhanced distribution of emergency alerts, messages and other public information. In one aspect, these tools can provide a controlled, secure channel for an emergency messages source to feed access providers, to prevent compromise of the distribution system, and to ensure the integrity of messages distributed by the system. In some cases, this secure channel can allow messages to be sent by multiple sources (governmental and otherwise), so long as each source has been authenticated and/or authorized to send such messages.

In one aspect, the tools provided by some embodiments can employ a universal signaling point that can receive an emergency message intended for a particular consumer and ensure that the message is distributed appropriately among the consumer's devices. The customer signaling point might register customer devices and/or maintain a state machine that devices can access once registered with the customer signaling point.

In another aspect of some embodiments, the messages distributed by the system can be signaled with regional specificity and/or according to the type of event to which the message pertains. The ISP's distribution system, the customer signaling point, and/or each customer device might be configurable to determine how messages are handled based on this signaling. Further, in some cases, the system can provide for interactive alert messaging, to allow a customer to interact with emergency or public safety personnel as necessary.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

Merely by way of example, one set of embodiments provides methods of providing information, including without limitation, emergency messages. This information can be provided, for example, to customers of an ISP. In an embodiment, a method comprises providing, at ISP, a secure channel for receiving emergency messages from an emergency message source. The method might further comprise providing a customer signaling point in communication with one or more customer devices operated by a customer of the ISP. In accordance with one embodiment, the ISP receives an emergency message from the emergency alert system via the secure channel. The method, then, might further comprise routing the emergency message through an access network of the ISP to the customer signaling point, and/or providing the emergency message from the customer signaling point to the customer and/or customer devices.

A system in accordance with another set of embodiments might comprise a distribution server operated by an ISP and a customer signaling point in communication with the distribution server and one or more customer devices. In an aspect, the distribution server might comprise one or more processors and a computer readable medium in communication with the one or more processors. In another aspect, the computer readable medium could have encoded thereon a set of instructions executable by the distribution server to perform one or more operations.

Merely by way of example, the set of instructions might comprise instructions for providing a secure channel for receiving emergency messages from an emergency message source. The set of instructions might further include instructions for routing the emergency message through an access network of the ISP. The customer signaling point thus might be configured to receive the emergency message via the access network and/or provide the emergency message to the customer.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments provide tools and techniques to enable enhanced distribution of emergency alerts and other public information. In one aspect, these tools can provide a secure channel for an emergency message source to prevent compromise of the distribution system, to ensure the integrity of messages distributed by the system. The channel can be secured at the source end, e.g., by authenticating the emergency message source, and at the recipient end, e.g., by authenticating customer devices that receive the information. In some cases, the secure channel might comprise a virtual private network through an Internet service provider's ("ISP") access network and/or through the Internet itself. This secure channel can allow messages to be sent by multiple sources (governmental and otherwise), so long as each source has been authenticated and/or authorized to send such messages.

In another aspect, these tools can provide a universal signaling system that can receive an emergency message intended for a particular consumer and ensure that the message is distributed appropriately among the consumer's devices via a customer-facing universal signaling point. In some cases, a signaling point might be implemented at a residential gateway and/or a network interface device at the customer's premises. Such devices can include, without limitation, broadband modems, interfaces between the customer's premises network and the access network, and/or the like. In other cases, a signaling point might be located in the access network itself, and/or it might be configured to communicate with a customer's residential gateway, network interface device, and/or any customer devices on the customer's premises network.

Because customer devices generally register with a residential gateway (e.g., to enable communication through the residential gateway for Internet access, video delivery, etc.), the residential gateway can maintain a state machine that devices can access once registered with the customer signaling point. This state machine functionality can allow the customer's own applications (e.g., applications running on customer devices) and/or notification systems to register with the signaling point to obtain emergency messages and process/deliver those messages in accordance with the customer's preferences. Alternatively and/or additionally, the customer signaling point might also function to send a generic and/or broadcast message to all devices (whether registered or not), and/or a registered device might have the ability to query the state machine for a current state (e.g., whether any emergency messages are in effect, whether such messages have been delivered to the customer, and/or the like.

In another aspect of some embodiments, the messages distributed by the system can be signaled with regional specificity and/or according to the type of event to which the message pertains, which can allow the ISP to determine appropriate recipients for the message. This functionality can also allow the customer signaling point and/or customer devices to determine how the message should be handled. Thus, in some cases, the ISP will register customer locations associated with each signaling point, in order to determine proper routing and distribution of messages.

In some embodiments, the ISP's distribution system, the customer signaling point, and/or each customer device can be configured to determine, e.g., based regional signaling, event type, etc., whether a particular message should be provided to the customer or ignored. For example, even within the same region, a customer in an urban setting might choose to ignore (and therefore have the customer signaling point filter out) warnings about forest fire danger while a customer in a suburban area bordering a forest might elect to have such messages delivered. Such filtering can be accomplished by the system (i.e., before messages are routed to customer signal points) and/or by customer signal points themselves (i.e., before delivering the message to customer devices.) Such filtering can include, without limitation, filtering on message type, filtering on message content (e.g., based on keywords in the message, etc.), on severity, and/or the like.

In an aspect of some embodiments, the system can provide for interactive alert messaging. Merely by way of example, a customer might be able to use the secure channel between the signaling point and the distribution server to interact with a public safety answering point ("PSAP"), either in response to an emergency message or on the customer's own initiatve. Such interaction can take the form of a data message, voice communications, and/or the like. Thus, for example, a signaling point can have a "help me" function and an emergency type path through the secure channel to reach a 911 operator, etc. This functionality can be implemented using a hardware and/or software interface on the residential gateway itself, and/or it can be accessed by a customer device and/or an application running on such a device. As noted above, in some embodiments, the system registers a location associated with each signaling point, and this location-awareness can allow the system to direct the emergency signal path to the proper PSAP or emergency agency. The location information can also be appended to the customer's message to the PSAP or other emergency agency.

Figure 1A:
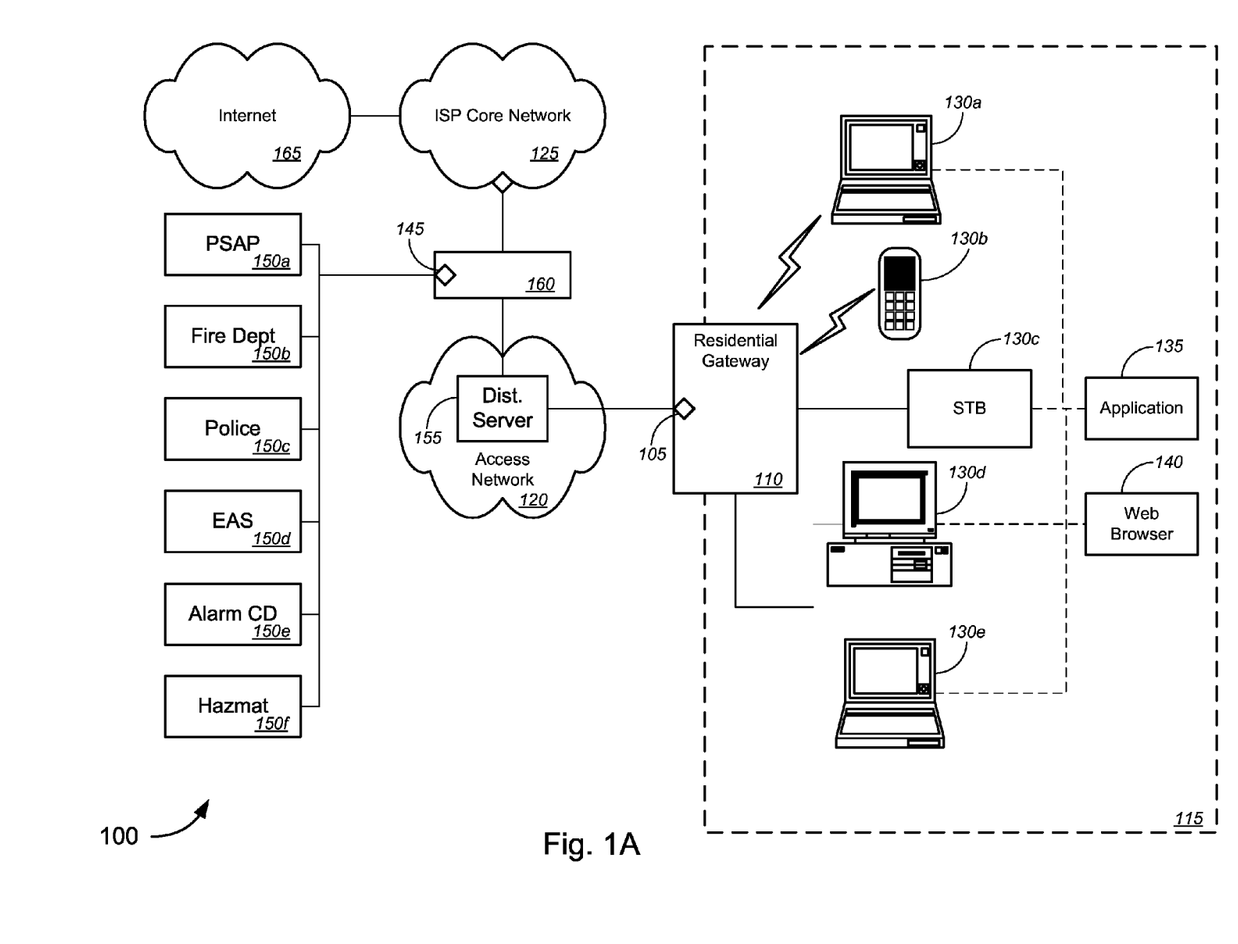
FIGS. 1A and 1B are block diagrams illustrating a system for distributing emergency messages and/or other information, in accordance with various embodiments.

FIG. 1A illustrates a system 100 that can provide these, and other, emergency alert signaling features. The system 100 includes a customer signaling point 105. In an aspect, the customer signaling point serves as a dedicated customer protocol interface between a customer (and/or, more specifically, one or more customer devices) and an emergency message distribution system. The customer signaling point 105 can be implemented in a variety of ways.

For example, in some cases, as illustrated by FIG. 1, a customer signaling point can be implemented by a residential gateway 110. A residential gateway 110 can be any device that provides connectivity between a subscriber and a provider's network. Such devices can include, without limitation, network interface devices ("NID"), broadband modems, voiceband modems, cellular modems, wireless modems and access points, routers, other interfaces between the customer's premises network and the access network, and/or the like. Typically, the residential gateway will be located at the customer's premises, but this is not required in all embodiments. The residential gateway 110 provides connectivity between a customer network 115 and an access network 120 operated by an Internet service provider ("ISP"), such as a broadband provider. The access network 120 provides, inter alia, connectivity between the customer's network 110 and the ISP's core network 125, as is known in the art. In a typical implementation, the residential gateway 110 will have a first communication interface (e.g., a broadband interface or an uplink interface) that communicates with the access network 120 using whatever broadband technology is employed (e.g., xDSL, DOCSIS, wireless broadband, etc.) and a second (local) communication interface that that provides connectivity with one or more customer devices (e.g., an Ethernet port, 802.11x radio, etc.). In some embodiments, the residential gateway 110 might include router functionality, such that the local communication interface might provide for communication with a plurality of devices in the customer network 115 via either wired or wireless connection. In other embodiments, the residential gateway 110 might provide a single local interface, and/or local router functionality might be implemented by a separate device. The nature of the customer's network 115 topology are not material to the scope of various embodiments.

In other cases, a customer signaling point 105 might be located at a device (not shown on FIG. 1) in the access network 120 itself and/or it might be configured to communicate with the customer's residential gateway 110 or network interface device, and/or any customer devices 130 on the customer premises network. The customer signaling point 105, in different embodiments, can be located at any location (or integrated with any device) that provides the customer signaling point 105 with the ability to provide a secure channel for emergency message signaling, as described herein. Thus, in some cases, the customer signaling point 105 can be in a device separate from the residential gateway 110 and/or access network 120, so long as it can communicate with appropriate devices in the access network 120 and/or the residential gateway 110 to provide the monitoring and control services described herein.

The customer devices 130 can include any devices that are capable of network communications (and, in particular aspects, IP communications). Such devices 130 can include, without limitation a laptop 130a, with wireless networking (e.g., IEEE 802.11x) capabilities, a mobile device 130b, (e.g., a mobile phone, tablet computer, personal digital assistant, etc.) with wireless networking capability, a television set top box 130c, a networked personal computer 130d, and/or laptop 130e, and the like. In some aspects, some (or all) of the customer devices 130 are programmed with applications 135 that access the Internet 125 (e.g., through the residential gateway 110 and/or the access network 120. Such applications can include, without limitation, web browsers 140, video on demand applications (such as Netflix™, to name one example), VoIP applications, online games, chat applications (including text chat, voice chat, and/or video chat applications), and any other type of application that requires, or can benefit from, a connection with the Internet. In some cases, as mentioned above, one or more of these applications might be configured to access the customer signaling point at the residential gateway 105 (or elsewhere), e.g., using an API, as described in further detail below.

While a web browser 140 can be considered, in one aspect, to be one of the applications 135 that use the Internet, the web browser 140 can also independently be used to provide a user interface to the customer signaling point 105 at the residential gateway 110 (or elsewhere), as described in further detail below. Thus, the customer signaling point 105 might be programmed with, e.g., a web server, in order to serve web pages to be displayed in a browser 140 of one or more of the devices 130 for providing the user interaction described further herein. (Of course, in some embodiments, one or more of the devices 130 might be programmed with a dedicated application that interfaces with the customer signaling point 105 to provide similar interaction.)

The system 100 might further comprise an entry signaling point 145, which serves as the interface between one or more messages sources 150 and the customer signaling point 105. In an aspect of some embodiments, the system establishes a secure channel between the customer signaling point 105 and the entry signaling point 145, to ensure the integrity of communications (e.g., emergency messages) through the network to the customer signaling point 105. In some embodiments, the system 100 also includes one or more distribution servers 155, which receive an emergency message from a message source 150 and route it to the appropriate customer signaling points.

The location of the entry signaling point can vary according to implementation. In some cases, the entry signaling point 145 might be implemented in an edge service point 160, which can be, for example an edge router that provides an interface between the access network 120 and the core network 125. In other cases, the distribution server 155 might serve as the entry signaling point 145. In other cases, the entry signaling point 145 might be implemented by an appropriate type of network device (such as a router) in the ISP's access network 120 or core network 125, or even the Internet 165.

Embodiments can support a variety of different message sources 150. Example illustrated by FIG. 1A include, but are not limited to, a public safety answering point ("PSAP") 150a,, a fire department 150b,, a police department 150c,, an Emergency Alert System ("EAS") 150c,, an alarm company 150e,, and a hazardous material response organization 150f. As explained in further detail below, the system 100 can provide communication between these (and other) messages sources 150 and one or more customer signaling points 105 (and, by extension, one or more customer devices 130 and the customer him- or herself). In some embodiments, such communications can be bidirectional.

In some cases, one message source might serve as a proxy or gateway for a variety of message sources. Merely by way of example, an Emergency Alert System 150 might provide a distribution outlet for emergency messages from a variety of local, state and/or federal organizations (such as the National Weather Service, the Department of Homeland Security, the Federal Emergency Management Agency, state emergency management organizations, local police departments 150c, or fire departments 150b, (any of which might communicate directly with the entry signaling point 145 or might communicate though the EAS 150c). In some cases, the system 100 might be used to distribute messages in parallel with other distribution techniques (such as conventional EAS broadcasts on radio and/or television).

Any of a variety of different types of messages or information can be distributed using the system 100. To name but a few examples, the system 100 can be used to distribute weather messages (such as severe weather warnings), civil defense alerts, Amber alerts, public safety information, and the like. In some cases, the system can also be used to distribute informational and/or promotional messages from the ISP and/or third parties.

Figure 1B:
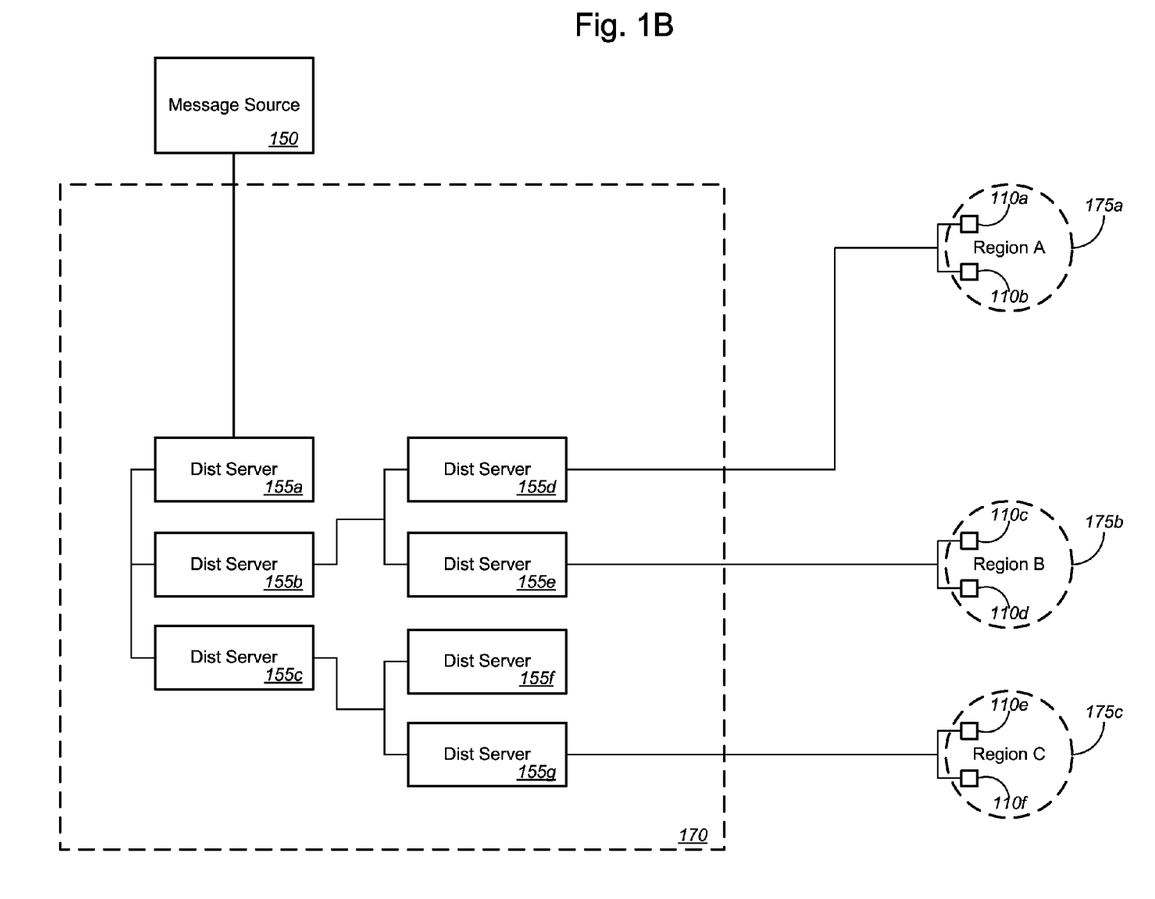

In some cases, the system 100 might employ a plurality of distribution servers 155. Merely by way of example, FIG. 1B illustrates an ISP network 170 (which might comprise an access network 120, a core network 125, or both) that includes a plurality of distribution servers 155 organized in a hierarchy (although hierarchical organization is not required in all embodiments). A top-level distribution server 155a might be in communication with a message source 150. The top-level distribution server might distribute the message to mid-level distribution servers 155b,, 155c. One of the mid-level distribution servers 155b, distributes the message to low-level distribution servers 155d, and 155f, while the other mid-level distribution server 155c, distributes the message to two other low-level distribution servers 155f, 155f. The low-level distribution servers 155d-g, then distribute the message to customer signaling points (e.g., residential gateways 110, as shown by FIG. 1B).

It should be appreciated, of course, that FIG. 1B is exemplary in nature, and that numerous variations are possible.

Merely by way of example, while FIG. 1B depicts a three-level hierarchy, other embodiments might feature hierarchies with more or fewer levels. Moreover, while FIG. 1B, for ease of illustration, shows each distribution server 155 at a particular level of the hierarchy as having two distribution servers 155 immediately subordinate, actual implementations might feature a single distribution server 155 with many immediate subordinate servers 155. In other embodiments, multiple top-level distribution servers 155a, might receive messages from one or more different message sources 150 and/or multiple top-level servers 155a, might distribute messages to a single server 155 at a lower level of the hierarchy. Based on the disclosure herein, one skilled in the art should understand that any number of different topologies can be used for the distribution server 155 network.

The use of a hierarchical network of distribution servers 155 can provide several advantages. For example, a hierarchical network is scalable, in that additional servers 155 and/or hierarchical layers can be added as more customer signaling points 105 are added to the network. Moreover, in some cases, a hierarchical network of distribution servers 155 can facilitate additional functionality in the distribution of messages. Merely by way of example, as described in further detail below, some embodiments feature selective routing of messages, in which not all messages are sent to all customer signaling points.

To illustrate one implementation of this functionality, FIG. 1B depicts a first distribution server 155d, in communication with residential gateways 110a, and 110, or, more specifically, customer signaling points (not shown on FIG. 1B) implemented within those residential gateways 110a, and 110b. These residential gateways 110a,, 110b are located a first region 175a,, which might be a particular neighborhood, city, state, etc. Similarly, a second distribution server 155e, is in communication with other residential gateways (e.g., 110c,, 110d) located in a second region 175b,, while a third distribution server 155g, is in communication with yet other residential gateways (e.g., 110e,, 110f) located in a third region 175c. (It should be appreciated, of course, that in actual implementations, a distribution server 155 generally will be in communication with many more customer signaling points the most illustrated by FIG. 1B, which presents a generalized schematic for the sake of clarity.)

In operation, if the top-level distribution server 155a, receives a message that is determined (e.g., as described in further detail below) to be appropriate for recipients located in the first region 175a, or the second region 175b,, that distribution server 155a, need only route the message to one mid-level distribution server 155b,, which then can determine whether the message is appropriate for customers in the first region 175a,, the second region 175b,, or both. If it is determined that the message is appropriate for customers in the first region 175a,, the mid-level distribution server 155b, will route the message to low-level distribution server 155d,, which can route the message to residential gateways (e.g., 110a,, 110b) located in (or otherwise associated with) that region 175a. Conversely, if it is determined that the message is appropriate for customers in the second region 175b,, the mid-level distribution server 155b, will route the message to low-level this distribution server 155e,, which can route the message to customer signaling points (e.g., 110c,, 110d) located in (or otherwise associated with) that region 175b. In some cases, if the message is appropriate for customers in both regions 175a. 175b,, the mid-level distribution server 155b, can route the message to both low-level distribution servers 155d,, 155e,, which can then route the message to the appropriate customer signaling points (e.g., residential gateways 110a,, 110b,, 110c,, 110d).

It should be appreciated, of course, that this selective routing functionality can also be implemented without the use of a hierarchical network of distribution servers 155. By the same token, a hierarchical network of distribution servers 155 can be employed in embodiments that do not feature selective routing functionality, because the hierarchical network can provide additional advantages as well. Thus, while some embodiments can employ multiple distribution servers 155 (arranged hierarchically or otherwise) and provide selective routing functionality, other embodiments may include either of those features without the other (or neither of the features).

Figure 2:
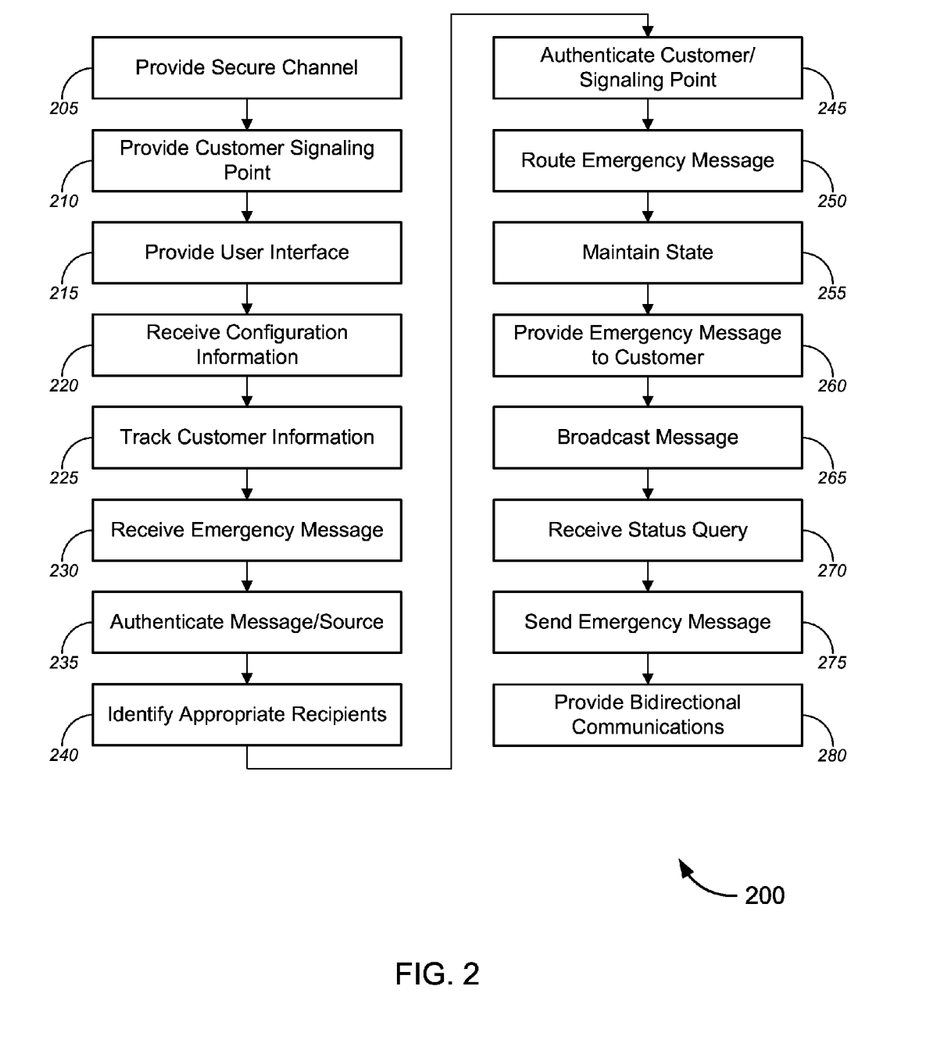
FIG. 2 is a process flow diagram illustrating a method of distributing emergency messages and/or other information, in accordance with various embodiments.
Figure 3:
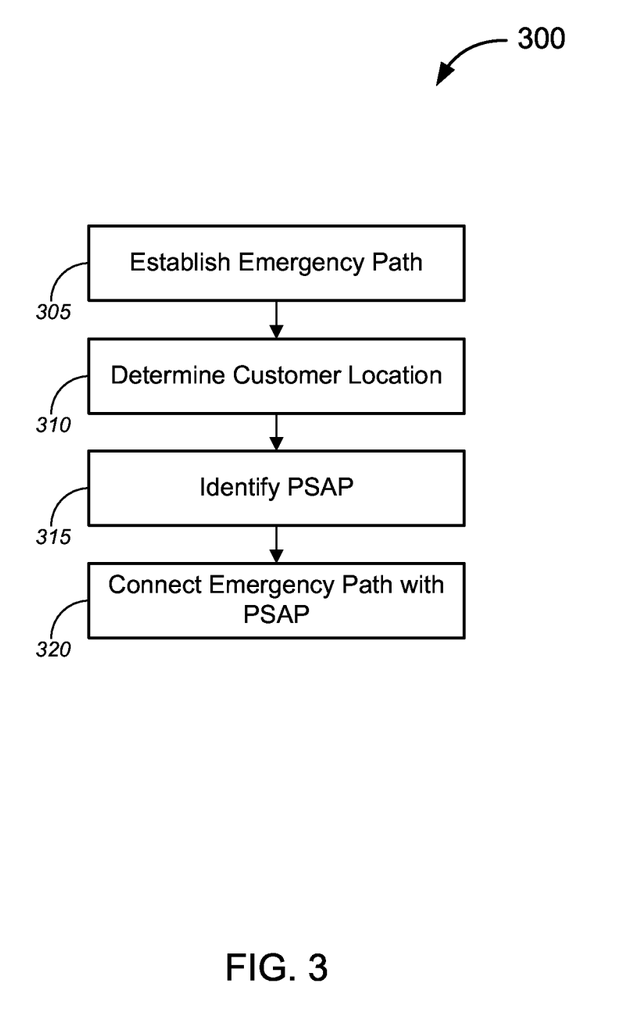
FIG. 3 is a block diagram illustrating a format for an emergency message, in accordance with various embodiments.

FIG. 2 illustrates a method 200 of distributing emergency messages (and/or any other appropriate information), in accordance with a set of embodiments. FIG. 3 illustrates a method 300 of providing bidirectional communication using an emergency message distribution network. While the methods of FIGS. 2 and 3 are illustrated, for ease of description, as different methods, it should be appreciated that the various techniques and procedures of these methods can be combined in any suitable fashion, and that, in some embodiments, the methods 200 and 300 depicted by FIGS. 2 and 3, respectively can be considered interoperable and/or as portions of a single method. Similarly, although the techniques and procedures of the methods 200 and 300 are depicted and/or described in a certain order for purposes of illustration, it should be appreciated that certain procedures may be reordered and/or omitted within the scope of various embodiments, and/or that operations can be added or substituted into the method 200 within the scope of various embodiments. Moreover, while (as noted above), the operations illustrated by FIG. 2 can be implemented by (and, in some cases, are described below with respect to) the system 100 of FIGS. 1A and 1B (or components thereof, such as the customer signaling point(s) 105 and/or the distribution server(s)), these operations can also be implemented using any suitable hardware implementation. Similarly, while the system 100 of FIGS. 1A and 1B (and/or components thereof) can operate according to the methods 200 and 300 illustrated by FIGS. 2 and 3 (e.g., by executing instructions embodied on a computer readable medium), the system 100 can also operate according to other modes of operation and/or perform other suitable procedures.

At block 205, the method 200 comprises providing, e.g., at an ISP, a secure channel for receiving emergency messages and/or other information. Providing a secure channel can comprise a variety of operations. Merely by way of example, in some cases, the ISP (or the message source) might establish a secure connection between the message source (which might be a data server operated by an emergency management organization) and the ISP's entry signaling point. Such a connection could comprise a VPN between the message source and the entry signal point, a connection secured by secure sockets layer ("SSL") or similar technology, and/or the like. In some cases, as described in further detail below, the secure entry point might require authentication by the message source. Providing a secure channel to receive a message can comprise some or all of these operations and/or any operations that can ensure the integrity of both the message source and the message received by the ISP. In some cases, providing a secure channel might comprise providing a secure channel over the entire message path from the message source to the customer signaling point that is to receive the message, as described in further detail below.

The method 200 further comprises providing a customer signaling point (block 210). Providing a customer signaling point can involve one or more of a variety of operations. Merely by way of example, in some cases, providing a customer signaling point might comprise providing the customer with a residential gateway that functions as a customer signaling point. In other cases, providing a customer signaling point can comprise operating a customer signaling point in the access network, or providing communication between the access network and a residential gateway (or other device) to allow the residential gateway (or other device) to act as a customer signaling point (or an interface thereto).

At block 215, the method 200 comprises providing a user interface. The user interface can provide for interaction between a user (e.g., a customer, etc.) and a computer system (e.g., a customer signaling point). For example, the user interface can be used to output information for a user, e.g., by displaying the information on a display device, printing information with a printer, playing audio through a speaker, etc.; the user interface can also function to receive input from a user, e.g., using standard input devices such as mice and other pointing devices, motion capture devices, touchpads and/or touchscreens, keyboards (e.g., numeric and/or alphabetic), microphones, etc.

The procedures undertaken to provide a user interface, therefore, can vary depending on the nature of the implementation; in some cases, providing a user interface can comprise displaying the user interface on a display device controlled by the customer signaling point; in other cases, however, in which the user interface is displayed on a device remote from the customer signaling point (such as on a client computer, wireless device, etc.), providing the user interface might comprise formatting data for transmission to such a device and/or transmitting, receiving and/or interpreting data that is used to create the user interface on the remote device. Alternatively and/or additionally, the user interface on a client computer (or any other appropriate customer device) might be a web interface, in which the user interface is provided through one or more web pages that are served from the customer signaling point (and/or a web server in communication with the computer system), and are received and displayed by a web browser on the client computer (or other capable customer device). The web pages can display output from the customer signaling point and receive input from the user (e.g., by using web-based forms, via hyperlinks, electronic buttons, etc.). A variety of techniques can be used to create these web pages and/or display/receive information, such as JavaScript, Java applications or applets, dynamic HTML and/or AJAX technologies, to name but a few examples.

In many cases, providing a user interface will comprise providing one or more display screens (an example of which is described below), each of which includes one or more user interface elements. As used herein, the term "user interface element" (also described as a "visual object," "user interface mechanism," or "user interface device") means any text, image, or device that can be displayed on a display screen for providing information to a user and/or for receiving user input. Some such elements are commonly referred to as "widgets," and can include, without limitation, icons, images, text, text boxes, text fields, tables and/or grids, menus, toolbars, charts, hyperlinks, buttons, lists, combo boxes, checkboxes, radio buttons, and/or the like. While any illustrated exemplary display screens might employ specific user interface elements appropriate for the type of information to be conveyed/received by computer system in accordance with the described embodiments, it should be appreciated that the choice of user interface elements for a particular purpose is typically implementation-dependent and/or discretionary. Hence, the illustrated user interface elements employed by any display screens described herein should be considered exemplary in nature, and the reader should appreciate that other user interface elements could be substituted within the scope of various embodiments.

As noted above, in an aspect of certain embodiments, the user interface provides interaction between a user and a computer system, such as the customer signaling point. Hence, when this document describes procedures for displaying (or otherwise providing) information to a user, or to receiving input from a user, the user interface may be the vehicle for the exchange of such input/output. Merely by way of example, in a set of embodiments, the user interface allows the user (e.g., the customer) to provide configuration information, review emergency messages (or other information), check the state of the customer signaling point, initiate (and/or conduct) bidirectional communications with a PSAP or other emergency service, and/or the like. (Of course, this functionality can also be provided by exposing an API to allow customer devices and/or applications to interact with the customer signaling point, rather than direct user interaction with the customer signaling point.)

Thus, for instance, at block 230, the method comprises receiving (e.g., at the customer signaling point) configuration information. The configuration information can comprise any type of information or instructions that indicate to the customer signaling point how emergency messages and/or other information should be handled by the customer signaling point. Such information and/or instructions can include, without limitation, information about customer devices, such as identification of the devices, descriptions of the devices' capabilities (including, in particular, each device's alerting capabilities with regard to providing emergency messages and/or other information to the customer), and/or the like.

Configuration information can also include customer preferences, such as preferences about to which devices emergency messages and/or information should be distributed and/or filtered. (As noted above, such filtering can be performed based on a variety of criteria, any of which can be provided as part of the configuration information.) Depending on the embodiment, the configuration of the customer signaling point can offer differing levels of granularity and/or customization of how emergency messages are delivered to various customer devices. Merely by way of example, the customer preferences can specify which messages should be delivered to the customer and which messages should be disregarded by the customer signaling point (or held at the customer signaling point for review at the customer's discretion but not proactively provided to the customer). For instance, a particular customer might not be interested in receiving any weather alerts other than hurricane alerts, and the customer therefore could provide configuration information to that effect. As another example, a customer who likes skiing but who does not live near a ski area might provide configuration information that specifies that severe weather alerts for the region of the customer's favorite ski area should be delivered to the customer, even though such out-of-region alerts generally would not be provided to the customer.

As another example, in some embodiments, the customer might be able to specify which one or more customer devices should receive emergency messages and/or information, depending on the nature of the message/information, the time of day (or day of the week, etc.) the message/information is received, the location of the customer (as determined, for example, by the location of the customer's wireless phone, which can be identified using GPS and/or other conventional position determination technologies), and/or the like. Similarly, the customer preferences might include an order in which the messages/information are to be provided to the selected customer devices (which, again, can depend on various factors). Thus, for example, the configuration information for particular type of message at a particular time of day might specify that the message should be displayed on a television screen by a set-top box, and that if receipt of the message is not confirmed (e.g., by the user pressing the particular button on a remote control for the set-top box), the message should be sent to the customer's wireless phone (e.g., as a text message or otherwise), and that if receipt of the message is not confirmed at the wireless phone (e.g., by the user pressing a button on the wireless phone) that the message should be sent via e-mail to the customer's e-mail address.

In an aspect, the configuration information might be received via a user interface, and in particular, via a GUI. Merely by way of example, the customer might access the customer signaling point through a webpage served by the customer signaling point (or another web server) and/or any other user interface provided by the customer signaling point. That webpage/interface might include a list of different types of messages/information and provide user-interface widgets (such as checkboxes, etc.) to allow the customer to specify how each particular type of message/information should be delivered (e.g. to which devices, in which order, at which times of day, etc.). The user interface might also allow the user to specify a default preference for delivery of messages/information for which preferences have not been defined.

The webpage/user interface might also allow the customer to identify various customer devices in communication with the customer signaling point. Merely by way of example, if the customer signaling point is implemented by a residential gateway that provides DHCP services for the customer's premises network, the user interface might present a list of all devices with DHCP leases from residential gateway and allow the customer to provide nicknames for such devices. In other cases, the customer might be able to define devices by IP address and/or other identifier. Based on the disclosure herein, one skilled in the arch appreciate that there are a wide variety of ways in which the customer can identify various customer devices with the user interface.

Once the customer devices have been identified, the user interface might also provide the customer with the ability to define the capabilities of each device and/or to specify how messages/information should be provided to each device (e.g., as a text message, as video and/or a video overlay, etc.). Alternatively and/or additionally, the user interface might provide the customer with the ability to specify under what circumstances a message/information should be provided to that particular device.

In another aspect, the configuration information might be received via an API. Merely by way of example, the customer signaling point API might expose methods that allow application to provide, inter alia, any of the configuration information described above. In this way, a customer device (and/or an application running on a customer device, such as a smart phone app, a personal computer application, etc.) can provide configuration information specific to that particular device, for other customer devices, and/or for the treatment of messages generally. Thus, it should be appreciated that various embodiments can employ multiple modes of receiving configuration information, and that the technique by which configuration information is provided to the customer signaling point can vary widely from embodiment to embodiment.

At block 225, the method comprises tracking customer information. The customer information can include a variety of information about the customer, the customers devices, and/or the alerts. Merely by way of example, as noted above and described in further detail below, certain embodiments operate a state machine at the customer signaling point, and one aspect of the state maintained by the state machine can be the status of each customer device. To enable this functionality, the customer signaling point might register each of the customer devices, e.g., based on configuration information received by the customer signaling point. Registering a customer device can comprise any operation by which the customer signaling point identifies the device and records that identification for later tracking. Thus, tracking customer information can include collecting and/or tracking a variety of information about the customer device (and/as such, in some cases, the registration of a customer device can be part of the tracking of customer information about that device). Such information can include, without limitation, identification of the device (e.g., by MAC address, IP address, etc.), presence information about the device (i.e., whether the customer device is, at any given time, currently on the customer's premises network and/or otherwise in communication with customer signaling point), capability information about the device (e.g., information about types of information that the customer device can accept and/or process, information about formats of messages/information that should be provided to the customer device, etc.), information about delivery preferences for the customer device (e.g., which types of messages/ information should be provided to the customer device, the format in which such messages/information should be provided, etc.), and/or the like.

The customer signaling point might track other customer information as well. For example, in some cases, the customer signaling point might track the current location of the customer (as a general matter, based on a schedule provided by the customer as configuration information, or more specifically, e.g., based on the location of the customer's wireless phone). In other embodiments, as described in further detail below, the customer signaling point tracks any messages/ information received by the customer signaling point and/or provided to the customer (e.g., whether the message has been delivered to the customer, whether delivery has been confirmed by the customer, etc.).

At block 230, the system will receive an emergency message (and/or other information to be distributed) from an emergency alert system or other message source. This message can be received, for example, at a secure channel established for receiving such messages and/or information and/or at an entry signal point. Although any of a variety of different types of messages and/or information can be received in this fashion, for purposes of this example, it is assumed that the message is an emergency message (e.g., a severe weather notification, a civil defense message, and/or the like) that should be distributed to at least a portion of the population in a particular area. As noted above, for example, the message might be distributed by the system in parallel with distribution through traditional broadcast media channels, although this is not required.

The emergency message (and/or other information) can be received in a variety of formats. For instance, in some cases, the message might be formatted as a text bulletin. In other cases, the message may comprise an audio and/or video file, and/or the message might be otherwise encoded. Alternatively and/or additionally, the message might include (e.g., in the text of the message and/or as metadata) information pertinent to message routing, such as context information that specifies a region to which the message pertains, context information that provides a category of an event to which the message pertains, and/or the like. In a particular embodiment, the message might have a format that includes a header and/or tail for context information, along with a payload that includes the message content itself (which can be text and/or rich content).

By way of example, an exemplary message header might include a field indicating the message source, a field indicating the event type, a field indicating the message priority or urgency, a field indicating affected regions to which the message applies, a field for an identifier that uniquely identifies the message and/or the event to which the message pertains. An exemplary message tail might include a field for an effective start and/or stop date/time of the message (which might be a future time, as in the case of weather notices) and/or a message expiration date/time. The organization of this (and other) context information into various fields, etc. is discretionary, and the fields described above should be considered only exemplary.

The nature of the message source can also vary by embodiment. In addition to the wide variety of message sources that can be supported (as described above), various embodiments can support receipt of messages/information from different types of entities. Merely by way of example, in some cases the emergency message might be sent by an automated process at the message source. In other cases, a human might type the emergency message using an interface provided by the entry signal point and/or manually upload the message to the entry signal point. Other possibilities exist as well.

In some embodiments, the system will authenticate the message, the message source, or both, prior to receiving the message/information and/or prior to distributing the message/information (block 235). As noted above, the process of authenticating the message and/or the message source can enable the establishment of the secure channel for receiving the message, thus ensuring the integrity of the message source (and, by extension, the message itself). Any of a wide variety of authentication schemes can be used to authenticate the message source. Examples include, but are not limited to, a conventional userid/password challenge/response system, a certificate-based system (in which message sources are provided with authentication certificates, either by the system itself or by third-party certificate provider, in the system examines a certificate provided with the message to authenticate the message source), key-based authentication (such as the Kerberos protocol, which can be used to authenticate the message source, and/or the PGP protocol, which might be used to sign and/or encrypt the message itself). Based on the disclosure herein, one skilled in the art should understand that any of a number of commercially available authentication mechanisms can be used to authenticate the message source.

The method 200 might include identifying appropriate recipients of the received message (block 240). Depending on the embodiment and/or the nature of the message, the operations used to identify appropriate recipients of the message can vary widely. Merely by way of example, if the message is intended for broadcast distribution across the entire area served by the ISP, the system might determine that all customers are appropriate recipients of the message. In other cases, however, context information included with the message (and/or otherwise determined by the system) can be used to identify appropriate recipients of the message. For instance, if the message includes region information that specifies a region to which the emergency message applies, the system (and/or component thereof, such as a distribution server), might identify customers located within that region as appropriate recipients of the message. A number of techniques can be used to determine whether a particular customer is located within a region to which a message applies.

Merely by way of example, as noted above, the system might register each customer signaling point and associate that customer signaling point with a location. Alternatively and/or additionally, customer billing information, wireless phone triangulation, serving central office location, and/or the like can be used to determine (to within whatever precision is necessary, possible, or appropriate) the location of the customer.

In other cases, the context information of the message might indicate a subject of the message (e.g. the nature of the event to which the message pertains), and this information can be analyzed against customer demographic information and/or customer preferences to determine whether a particular customer is an appropriate recipient of the message. (This technique, of course, assumes that customer preferences are communicated from that customer's signaling point to a distribution server and/or some other system component. Alternatively and/or additionally, such preferences might not be communicated by customer signal point, and/or the customer signal point might make a determination upon receiving the message as to whether the message should be provided to the customer; this technique is described in further detail below.)

In an aspect of certain embodiments, the system will authenticate the selected recipients (block 245). In some cases, authenticating a selected recipient (e.g., a recipient for whom the message is determined to be appropriate, or if the message is generally, rather than selectively, routed, any recipient) may comprise authenticating a customer signaling point associated with that recipient (because the messages actually routed to the customer signaling point associated with the recipient), in other cases, the customer him- or herself might be authenticated. Any suitable authentication technique, including without limitation those described above, can be used to authenticate the recipient and/or the recipient's customer signaling point. In some cases, for example, authenticating a customer service point can be used to establish a secure connection between the customer signaling point and a distribution server, interested no point, and/or the like. Such a secure connection can be a virtual private network ("VPN"), which can be secured using a variety of available technologies, such as IPSec, secure socket layer transport level security ("SSL/TLS"), and/or the like. (It should be noted as well that such technologies can be used create a virtual private network to provide secure channel between the message source and the entry signal point, as described above, or even in some embodiments, a VPN/security channel between the message source in the customer signaling point itself.)

At block 250, the system (or a component thereof, such as a distribution server) routes the message/information to the customer, or more specifically in some embodiments, the customer signaling point. As noted above, in many cases, the system will route the message to a plurality of customer signaling points (in fact, given the nature of emergency messages, such messages often will be routed to a relatively substantial proportion of ISP's subscriber population). Essentially, routing the message can comprise any operation(s) that transports the message (and/or the relevant information therein) to the customer signaling points that have been determined to be appropriate recipients of the message, whether such determination is made explicitly (e.g., as described above) or implicitly (e.g., by simply transmitting the message to all customer signaling points capable of receiving the message). Merely by way of example, in some embodiments, routing the message might comprise transmitting a broadcast message comprising the emergency message (and/or the relevant information therein) to all customer signaling points. As another example, running the message might comprise transmitting unicast messages to each selected customer signaling point and/or broadcasting a unicast message for unregistered devices as well.

In an embodiment, the message is routed through the ISP's access network, which, as described above, generally provides Internet connectivity for each customer's residential gateway. Thus, a message may be routed through several intermediate hops (e.g., routers etc.) through the access network in similar fashion to other data. In particular cases, the message routing path between the entry signaling point (and/or distribution server) might comprise a secure connection between that interested in knowing point/distribution server and the destination customer signaling point, as described above. Thus, in some cases, routing the message to a particular customer signaling point can comprise establishing an emergency path (e.g., a dedicated and/or secure virtual channel) between the message source (and/or the entry signaling point) and the customer signaling point, and routing the message over that emergency path.

Some embodiments, as noted previously, will employ a hierarchical network of distribution servers. In such cases, routing a message through the access network can comprise transmitting the message through the hierarchy distribution servers. In some cases, at each step in the hierarchy, a distribution server will determine which, of one or more, subsidiary distribution servers should receive the message for further running through the hierarchy, and eventually to customer signaling points served by the lowest level distribution server(s) in that branch of the hierarchy. Using the technique described above, context information can be used by the distribution servers to make this determination. In an aspect, existing emergency area routing standards can be adopted into this new message transmission system to ensure effected customers are alerted for regionally specific warning messages.

Thus, once the message has been routed to the appropriate customer signaling points, the message will be received at those signaling points. Blocks 255-260 of FIG. 2 describe operations that can be performed, in some embodiments, by a customer signaling point upon receiving a message from the network (e.g., from a distribution server, entry signaling point, etc.).

As noted, a customer signaling point will, in some embodiments, comprise a state machine that tracks the state of customer devices registered with the customer signaling point and/or emergency messages (or other messages/information) received by the customer signaling point. Thus, at block 255, the method 200 comprises maintaining messaging state. In a particular embodiment, the customer signaling point maintains this messaging state. Merely by way of example, the state machine might, at all times, maintain a state that tracks a device status (e.g., connected, idle, available for message distribution, powered off, unavailable, etc.) of each device registered with the customer signaling point.

The state machine might also maintain a message state. For example, before receiving an emergency message (or other messages or information), the state machine might have state of "no messages pending." Upon receiving the message, the state machine my transition to a state of "message received" until the message is delivered to one or more of the customer devices, at which point the state machine my transition to a state of "message delivered." Upon receiving confirmation from at least one of the customer devices that the customer actually saw and/or responded to the message (e.g., by confirming via a user interface of the customer device that he or she has seen the message), state machine my transition to a state of "message delivery confirmed." At some point (e.g., after a suitable period of time, upon expiration of the message as indicated by the message context information, upon receipt of configuration information resetting the state, etc.) the state machine by transition back to a state of "no messages pending." In other cases, the state machine might maintain a state with regard to each message received, so that the state machine state with regard to one message might be "message delivery confirmed" (and the state might be a final state for that message), while the machine state with regard to another message might be "message received," until the second messages delivered at which point the state for that message would transition to "message delivered," and so forth. (It should, of course, be appreciated that the states described herein are exemplary in nature, and that any of the number of different states can be defined in various embodiments.)

At block 260, the customer signaling point provides the message/information to the customer. Providing the message/information to the customer can take a variety of forms. Merely by way of example, as noted above, configuration information provided by the customer (or provided by other sources, such as the customer devices themselves) can define how messages are to be provided to the customer, based on the context of the message, the customer's preferences, device capabilities, and/or the like. Thus, for instance, for a particular message, providing the message to the customer may comprise transmitting the message to one or more of the customer devices (in serial and/or parallel fashion), as defined by the configuration information. In other cases, providing the message to the customer may comprise displaying the message with customer signaling point's user interface (or otherwise providing the message through the user interface, such as by playing video or audio, etc.).

The format of the information provided to the customer (and/or to the customer device) can vary according to the embodiment and/or to the nature of the message received by the customer signaling point. The format of the information can also vary according to the capabilities of the customer device to which information is sent and/or according to the mode of communication between the customer signaling point and the customer device.

Merely by way of example, the communication between the customer signaling point and the customer device might be limited to brief textual communications, either by design or by necessity. For instance, in some cases the customer signaling point might use SMS messages (which generally are limited to 140 textual characters) to communicate an emergency message to the wireless phone. Alternatively and/or additionally, the customer signaling point might use other modes of communication that are similarly limited.

In many cases, however, the emergency message itself might comprise rich content (e.g., audio, video, and/or images) and/or text that exceeds the limitations of the mode of communication between the customer signaling point and the customer device. In such a case, the customer signaling point might include with the message a link (such as a URL) to an information source, such as a web server or other facility, at which the emergency message itself, and/or additional information pertaining to the emergency message, can be accessed. In some cases, for example, the customer signaling point (which, as noted above, can include a web server and/or can publish information using a web-based interface) might publish the emergency message on such a webpage, which might be generally accessible or might be accessible only to the customer associated with that customer signal point. The message distributed to the customer device could then include a URL that references this webpage. Alternatively and/or additionally, the ISP might publish the emergency message, and/or a third party might publish the emergency message, and the URL could reference the emergency message on the ISPs web server and or the third party's web server.

In an embodiment, providing the message to the customer may comprise receiving confirmation from at least one of the customer devices that the customer has reviewed the message, and/or repeatedly transmitting a message to one or more customer devices (which may be the same or different customer devices in each case) until receiving confirmation. Such behavior can be defined by configuration information and/or may be based on the context of the message. Merely by way of example, relatively urgent messages may be periodically retransmitted the customer devices until confirmation is received, while relatively trivial messages might only be transmitted once and my not require delivery confirmation.

The customer signaling point can provide the message to the customer in other ways as well. For instance, in some cases, depending on the configuration of the customer signaling point and/or the nature of the message, providing the message to the customer might comprise broadcasting the message/information to each registered customer device (block 265). Alternatively and/or additionally, the customer signaling point might receive a status query from the customer (block 270), e.g., via the user interface and/or an API. In response to the query (or otherwise), the customer signaling point might send the message/information to the querying device (block 275), and/or provide the message via the user interface, in response to the query.

In a set of embodiments, the system is configured to provide bidirectional communications between the customer and one or more agencies (e.g., PSAPs, fire departments or other emergency responders, etc.) (block 280). In some (but not all) cases, the bidirectional communication pertains to an emergency message distributed by a message source, and the bidirectional communication might be conducted between the customer and the message source. In other cases, however, the bidirectional communication is not related to any particular emergency message distributed by the system; instead, the communication might related to a household emergency, etc. A variety of techniques can be used to provide these communications. Merely by way of example, the method 300 of FIG. 3 can be used for this purpose.

At block 305, the method 300 comprises establishing an emergency path between the customer signaling point and the entry signaling point (or another interface between the ISP and the PSAP/responder. As noted above, the system often will establish a routing path between the entry signaling point and the customer signaling point, and in particular embodiments, this routing path might comprise a secure channel. In certain embodiments, then, this secure channel (which might be a transient connection established, e.g., by a distribution server, for distribution of a particular emergency message or by the customer signaling point for customer-initiated communications, and/or might be a persistent connection) can be used as the emergency path between the customer signaling point and the entry signaling point (or other interface to the PSAP/responder).

As one skilled in the art will appreciate, in the case of a household emergency, it is important to identify the correct PSAP/responder for an emergency call, in order to prevent unnecessary delays in the response to the emergency. Often, the identity of the correct PSAP/responder will depend on the location of the customer. Thus, the method 300 might further comprise determining a customer location (block 310). As noted above, a variety of techniques can be used to determine a customer location, and any such technique can be used in this context as well. Based on the customer location, the system identifies an appropriate PSAP (or other agency) to participate in the communication (block 315), e.g., using any of a variety of known techniques to correlate a person's location with the appropriate PSAP to receive an emergency call from that person.

At block 320, the system connects the emergency path with the identified PSAP. This connection can involve any of a variety of operations. Merely by way of example, the ISP might establish a secure channel with the PSAP in the fashion described above (or, if the customer's communication pertains to an emergency message, the message source might already have established a secure connection with the ISP, as described above). The system can then bridge the emergency path from the customer signaling point with the secure channel to the PSAP/message source. At that point, the customer can commence bidirectional communication with the PSAP/message source, using one of the customer devices in communication with the customer signaling point (which can route the communications over the emergency path), and/or the user interface of the customer signaling point itself. Such communications can take any suitable form, including without limitation, voice, video chat, text chat, and/or the like.

Figure 4:
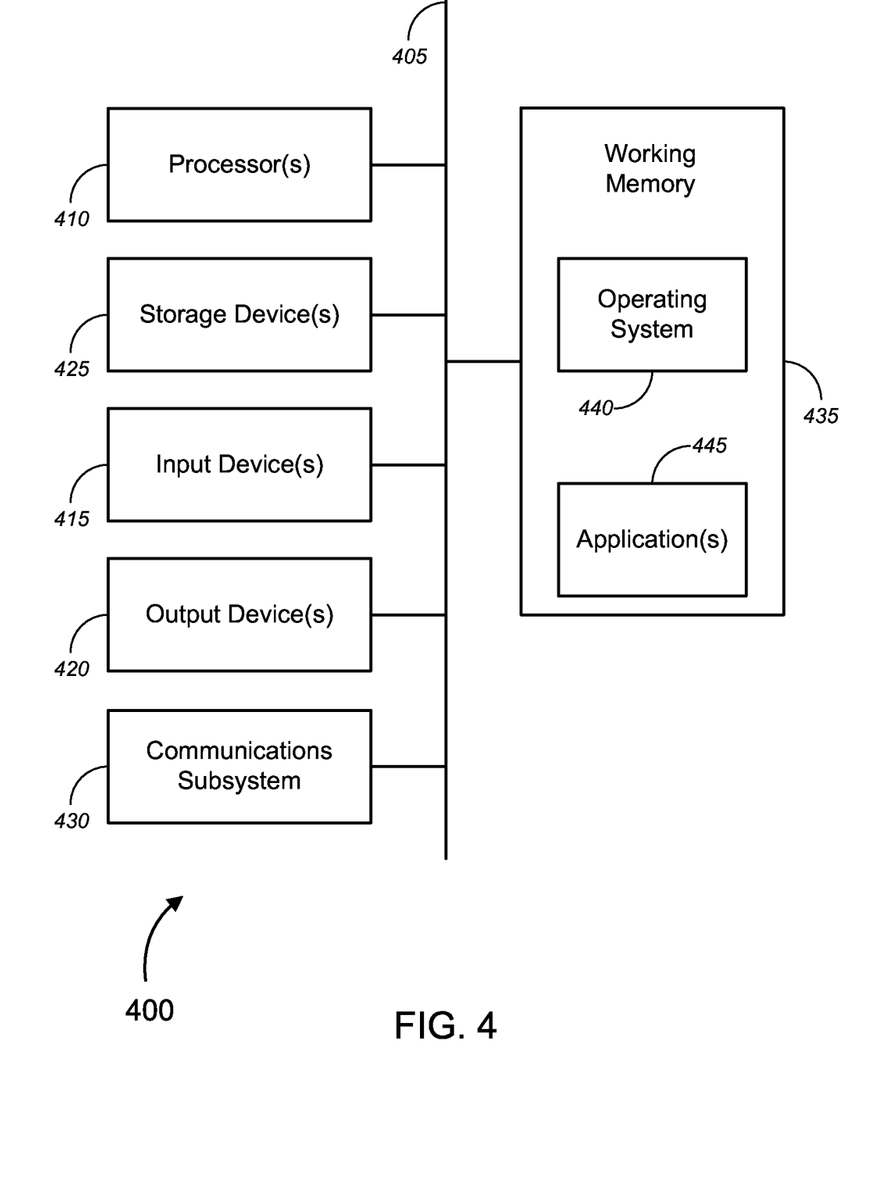
FIG. 4 is a generalized schematic diagram illustrating a computer system, in accordance with various embodiments.

FIG. 4 provides a schematic illustration of one embodiment of a computer system 400 that can perform the methods provided by various other embodiments, as described herein, and/or can function as a customer signaling point, residential gateway, monitoring device, customer device, and/or the like. It should be noted that FIG. 4 is meant only to provide a generalized illustration of various components, of which one or more (or none) of each may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements may include one or more processors 410, including without limitation one or more general-purpose processors and/or one or more special-purpose processors (such as digital signal processing chips, graphics acceleration processors, and/or the like); one or more input devices 415, which can include without limitation a mouse, a keyboard and/or the like; and one or more output devices 420, which can include without limitation a display device, a printer and/or the like.

The computer system 400 may further include (and/or be in communication with) one or more storage devices 425, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 400 might also include a communications subsystem 430, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 430 may permit data to be exchanged with a network (such as the network described below, to name one example), with other computer systems, and/or with any other devices described herein. In many embodiments, the computer system 400 will further comprise a working memory 435, which can include a RAM or ROM device, as described above.

The computer system 400 also may comprise software elements, shown as being currently located within the working memory 435, including an operating system 440, device drivers, executable libraries, and/or other code, such as one or more application programs 445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 425 described above. In some cases, the storage medium might be incorporated within a computer system, such as the system 400. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 400) to perform methods in accordance with various embodiments of the invention. According to a set of embodiments, some or all of the procedures of such methods are performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another computer readable medium, such as one or more of the storage device(s) 425. Merely by way of example, execution of the sequences of instructions contained in the working memory 435 might cause the processor(s) 410 to perform one or more procedures of the methods described herein.

The terms "machine readable medium" and "computer readable medium," as used herein, refer to any medium that participates in providing data that causes a machine to operation in a specific fashion. In an embodiment implemented using the computer system 400, various computer readable media might be involved in providing instructions/code to processor(s) 410 for execution and/or might be used to store and/or carry such instructions/code (e.g., as signals). In many implementations, a computer readable medium is a non-transitory, physical and/or tangible storage medium. Such a medium may take many forms, including but not limited to, non-volatile media, volatile media, and transmission media. Non-volatile media includes, for example, optical and/or magnetic disks, such as the storage device(s) 425. Volatile media includes, without limitation, dynamic memory, such as the working memory 435. Transmission media includes, without limitation, coaxial cables, copper wire and fiber optics, including the wires that comprise the bus 405, as well as the various components of the communication subsystem 430 (and/or the media by which the communications subsystem 430 provides communication with other devices). Hence, transmission media can also take the form of waves (including without limitation radio, acoustic and/or light waves, such as those generated during radio-wave and infrared data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400. These signals, which might be in the form of electromagnetic signals, acoustic signals, optical signals and/or the like, are all examples of carrier waves on which instructions can be encoded, in accordance with various embodiments of the invention.

The communications subsystem 430 (and/or components thereof) generally will receive the signals, and the bus 405 then might carry the signals (and/or the data, instructions, etc. carried by the signals) to the working memory 435, from which the processor(s) 405 retrieves and executes the instructions. The instructions received by the working memory 435 may optionally be stored on a storage device 425 either before or after execution by the processor(s) 410.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   providing, at an Internet service provider ("ISP"), a secure channel for receiving emergency messages from an emergency message source;
   providing a customer signaling point in communication with one or more customer devices operated by a customer of the ISP;
   receiving, at the ISP, an emergency message from an emergency alert system via the secure channel;
   routing the emergency message through an access network of the ISP to the customer signaling point; and
   providing the emergency message from the customer signaling point to the customer.

2. The method of claim 1, wherein the emergency message source is an emergency alert system ("EAS").

3. The method of claim 1, further comprising:
   routing the emergency message to a plurality of customer signaling points.

4. The method of claim 1, further comprising:
   identifying the customer signaling point as an appropriate recipient of the emergency message, wherein routing the emergency message through the access network of the ISP to the customer signaling point is based on identifying the customer signaling point as an appropriate recipient of the emergency message.

5. The method of claim 1, wherein the emergency message comprises context information, and wherein identifying the customer signaling point as an appropriate recipient of the emergency messages comprises:
   determining, based at least in part on the context information, that the emergency message should be routed to the customer signaling point.

6. The method of claim 5, wherein:
   the context information comprises region information specifying a region to which the emergency message applies; and
   determining that the emergency message should be routed to the customer signaling point comprises determining that the customer resides or is located within the region to which the emergency message applies.

7. The method of claim 1, wherein the customer signaling point comprises a dedicated customer protocol interface.

8. The method of claim 7, wherein the dedicated customer protocol interface is located at a residential gateway.

9. The method of claim 7, wherein the dedicated customer protocol interface is located within the access network of the ISP.

10. The method of claim 1, wherein the customer signaling point comprises a state machine that registers the one or more customer devices.

11. The method of claim 10, wherein the state machine tracks emergency messages provided to the customer of the ISP.

12. The method of claim 10, wherein the state machine tracks alerting capability of the one or more customer devices.

13. The method of claim 1, wherein providing the emergency message comprises sending a broadcast message from the customer signaling point to the one or more devices.

14. The method of claim 1, wherein providing the emergency message comprises:
   receiving, at the customer signaling point, a status query from one of the customer devices; and
   sending the emergency message to the one of the customer devices in response to the status query.

15. The method of claim 1, wherein providing the emergency message comprises:
   providing a link to an information source for additional information pertaining to the emergency message.

16. The method of claim 1, further comprising:
   authenticating the emergency message, the emergency message source, or both, at the ISP prior to routing the emergency message to the customer signaling point.

17. The method of claim 1, further comprising:
   authenticating the customer, the customer device, or both, prior to providing the emergency message to the customer.

18. The method of claim 1, further comprising:
   establishing, in the access network, an emergency path between the secure channel and the customer signaling point;
   wherein routing the emergency message comprises routing the emergency message via the emergency path.

19. The method of claim 18, further comprising:
   providing bidirectional communications between the customer and an emergency response team via the emergency path.

20. The method of claim 19, wherein providing bidirectional communications comprises:
   determining a location of the customer;
   identifying a public safety answering point ("PSAP") corresponding to the location of the customer; and
   connecting the emergency path with the identified PSAP.

21. The method of claim 1, wherein the one or more customer devices comprise a television set top box.

22. The method of claim 1, wherein the one or more customer devices comprise a wireless phone.

23. The method of claim 1, wherein the one or more customer devices comprise a personal computer.

24. The method of claim 1, wherein:
   receiving an emergency message comprises receiving the emergency message at a master distribution server; and
   routing the emergency message comprises:
      routing the emergency message from the master distribution server to a subsidiary distribution server; and
      routing the emergency message from the subsidiary distribution server to the customer signaling point.

25. A system for providing emergency messages to customers of an Internet service provider ("ISP"), the system comprising:
   a distribution server operated by the ISP, the distribution server comprising one or more processors and a computer readable medium in communication with the one or more processors, the computer readable medium having encoded thereon a set of instructions executable by the distribution server to perform one or more operations, the set of instructions comprising:
      instructions for providing a secure channel for receiving emergency messages from an emergency message source; and
      instructions for routing the emergency message through an access network of the ISP; and
   a customer signaling point in communication with the distribution server and one or more customer devices, the customer signaling point being configured to:
      receive the emergency message via the access network; and
      provide the emergency message to the customer.

* * * * *